US010785105B1

(12) United States Patent
Rathinasabapathy et al.

(10) Patent No.: US 10,785,105 B1
(45) Date of Patent: Sep. 22, 2020

(54) DYNAMIC MONITORING ON SERVICE HEALTH SIGNALS

(71) Applicant: Microsoft Technology Licensing, LLC, Redmond, WA (US)

(72) Inventors: Mangalam Rathinasabapathy, Bellevue, WA (US); Rahul Nigam, Bothell, WA (US); Vinod Menon, Bothell, WA (US); Esha Sharma, Sammamish, WA (US); Mark Raymond Gilbert, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/351,426

(22) Filed: Mar. 12, 2019

(51) Int. Cl.
*H04L 12/24* (2006.01)
*H04L 29/08* (2006.01)
(Continued)

(52) U.S. Cl.
CPC .............. *H04L 41/082* (2013.01); *G06F 8/65* (2013.01); *G06N 20/00* (2019.01); *H04L 43/08* (2013.01);
(Continued)

(58) Field of Classification Search
CPC ............. G06F 19/3468; G06F 11/0706; G06F 11/0751; G06F 11/0778; G06F 11/079; G06F 11/34; G06F 11/3447; G06F 11/3452; G06F 11/3476; G06F 16/2465; G06F 2201/865; G06F 2216/03; H04L 41/0896; H04L 41/142; H04L 41/147; H04L 41/22; H04L 41/5096; H04L 67/1097; H04L 67/34; H04L 63/1433; H04L 67/12;
(Continued)

(56) References Cited

U.S. PATENT DOCUMENTS 7,714,702 B2  5/2010  Khuzadi
7,962,797 B2  6/2011  Goldszmidt et al.
(Continued)

FOREIGN PATENT DOCUMENTS

WO    2016112058 A1    7/2016
WO    2016160381 A1    10/2016

OTHER PUBLICATIONS

"CPU & Memory Monitoring Software", Retrieved from: https://www.manageengine.com/network-monitonng/cpu-memory-disk.html?network=g&device=c&keyword=%2Bsystem%20%2Bhealth%20%2Bmonitoring&campaignid=945797228&ccreative=302205962578&matchtype=b&adposition=1o1&placement=&adgroup=63188821354&,targetid=kwd-305748465835&gclid=EAlalQobChMlkvL1rfb93wIVCx4rCh1s4wjFEAMYASAAEgKK-PD_BwE, Retrieved on Feb. 6, 2019, 7 Pages.
(Continued)

*Primary Examiner* — Djenane M Bayard

(57) ABSTRACT

In non-limiting examples of the present disclosure, systems, methods and devices for monitoring telemetry data from a cloud-based application service are presented. Telemetry data for a plurality of operations for the cloud-based application service may be analyzed, wherein the analysis comprises comparing a first time series with a second time series, and where data from the second time series relates to operations that were executed prior in time compared with execution of operations related to the first time series. One or more operational changes in the cloud-based application service may be identified based on the analysis, and at least one telemetry monitor may be dynamically configured based on the one or more operational changes that were identified.

20 Claims, 9 Drawing Sheets

(51) Int. Cl.
*H04L 12/26* (2006.01)
*G06F 8/65* (2018.01)
*G06N 20/00* (2019.01)

(52) U.S. Cl.
CPC .............. *H04L 43/16* (2013.01); *H04L 67/10* (2013.01); *H04L 67/34* (2013.01)

(58) Field of Classification Search
CPC .............. H04L 9/3247; H04L 43/0817; H04L 63/1408; H04L 41/0869; H04L 63/02; H04L 9/0643; H04L 9/0894; H04L 9/3236; H04L 2209/12; H04L 41/00; H04L 41/064; H04L 41/082; H04L 67/125; H04L 63/14; H04L 63/20; H04L 9/0861; H04L 9/14; H04L 12/12; H04L 2209/08; H04L 2209/38; H04L 41/046; H04L 41/12; H04L 43/12; H04L 63/00; H04L 63/0209; H04L 63/0281; H04L 63/061; H04L 63/0807; H04L 63/0823; H04L 63/0876; H04L 63/10; H04L 63/101; H04L 63/12; H04L 63/1416; H04L 63/1425; H04L 63/145; H04L 67/42; H04L 69/14; H04L 9/002; H04L 9/0618; H04L 9/0877; H04L 9/3213; H04L 9/3234; H04L 9/3239; H04L 9/3242; H04L 9/3265; H04L 9/3268
See application file for complete search history.

(56) References Cited

U.S. PATENT DOCUMENTS

| | | | |
|---|---|---|---|
| 8,161,323 | B2 | 4/2012 | Kuchibhotla et al. |
| 8,694,835 | B2 | 4/2014 | Terris et al. |
| 2007/0226554 | A1 | 9/2007 | Greaves et al. |
| 2014/0109113 | A1 | 4/2014 | Stacy et al. |
| 2018/0276096 | A1 | 9/2018 | Gao et al. |
| 2019/0064787 | A1* | 2/2019 | Maturana ........... G05B 23/0283 |
| 2019/0215230 | A1* | 7/2019 | Mermoud ........... H04L 41/0636 |
| 2019/0253328 | A1* | 8/2019 | Kolar .................... G06F 11/362 |
| 2019/0391798 | A1* | 12/2019 | Farrell ...................... G06F 8/65 |

OTHER PUBLICATIONS

Lavi, et al., "Metric Alerts with Dynamic Thresholds in Azure Monitor (Public Preview)", Retrieved from: https://web.archive.org/web/20190309134700/https://docs.microsoft.com/en-us/azure/azure-monitor/platform/alerts-dynamic-thresholds, Nov. 29, 2018, 7 Pages.
Narumoto, et al., "Monitoring and Diagnostics", Retrieved from: https://web.archive.org/web/20190108100746/https://docs.microsoft.com/en-us/azure/architecture/best-practices/monitoring, Jul. 13, 2016, 36 Pages.
"International Search Report and Written Opinion Issued in PCT Application No. PCT/US2020/021056", dated Jun. 8, 2020, 13 Pages.

\* cited by examiner

DYNAMIC MONITORING ON SERVICE HEALTH SIGNALS

BACKGROUND

As computing has increasingly moved toward the cloud, systems that support large numbers of users and the cloud-based applications that they utilize are constantly being modified. The infrastructure of cloud-based systems requires constant monitoring just to maintain, not to mention to update and add additional features and functionality. As new software builds are continuously added to the infrastructure of cloud-based systems through development rings, and eventually production environments, it becomes increasingly resource intensive and difficult to modify existing monitors and create new ones to keep up with the ever-changing builds.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for automatically identifying software modifications in cloud-based application services and dynamically configuring operational monitors in those environments. The monitors may be automatically generated, modified and/or deleted based on analysis of time series information from a telemetry service associated with or integrated in the cloud-based application service. The telemetry service may receive operational data, including operation logs, from operations that are executed by users of the cloud-based application service. A determination may be made that monitors should be generated, modified and/or deleted by automatically comparing pre-software update time series data to post-software update time series data. When new monitors are dynamically generated and/or modified, a dynamic monitor engine may determine appropriate monitoring techniques for each corresponding operation type, baseline operational ranges, and/or thresholds for flagging operations for further review. The dynamic monitor engine may apply one or more machine learning models in making these determinations and setting these ranges and thresholds. The dynamic monitor engine may apply these models in the context of the processing resources that are available to the cloud-based application service, thereby allocating operational analysis bandwidth for each monitor according to the resources available in the system.

BRIEF DESCRIPTION OF THE DRAWINGS

Non-limiting and non-exhaustive examples are described with reference to the following figures.

DETAILED DESCRIPTION

Figure 1:
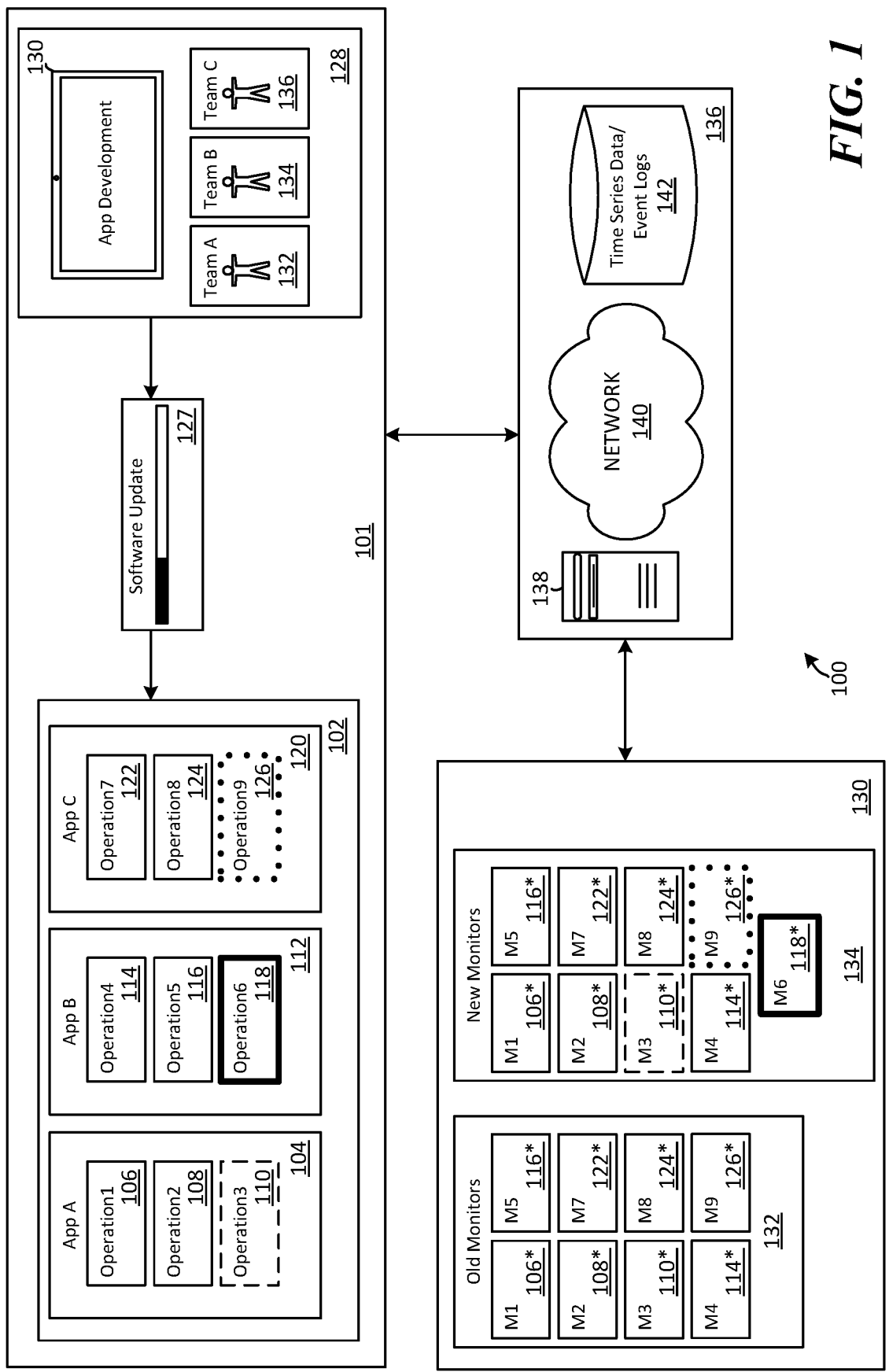
FIG. 1 is a schematic diagram illustrating an example distributed computing environment for dynamically configuring monitors for a cloud-based application service.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for dynamically creating monitors for software implemented in cloud-based application services. In examples, the monitors may provide mechanisms for identifying code regressions in the implemented software and/or other service functionality loss (e.g., server issues, network problems, etc.). The code regressions may be included in new software packages, updates, and/or patches, for example. In some examples, the code regressions may be associated with one or more cloud-based applications, such as cloud-based document processing applications, spreadsheet applications, calendar applications, presentation applications, storage applications, video applications, real-time electronic messaging applications, voice messaging applications, video communication applications, and/or email applications.

In some examples, a monitor may analyze signals associated with operation failures related to one or more cloud-based applications. For example, when an operation for a cloud-based application fails, and/or an operation for a cloud-based application causes an application crash or malfunction when it is performed, a signal indicating that there was an operation event, or operation failure, may be reported to the monitor and/or a telemetry service associated with the monitor. A monitor may receive and analyze data associated with execution of one or more operations of applications hosted by a cloud-based application service. For example, the monitor may analyze data associated with "save" operations, "send" operations, "new document" operations, "copy" operations, "paste" operations, and any other operation that may be performed by cloud-based applications.

A telemetry service may receive and store information associated with operations that have been executed by applications hosted by a cloud-based service. The telemetry service may store information about each executed operation including: a time that each operation was executed; an identity of each operation that was executed; a duration of time that each operation took to complete or time out; whether each operation was successful or unsuccessful; an indication of whether a monitor is receiving data associated with each operation; a name of each monitor that is associated with each operation; a server or server farm that executed each operation, etc. Thus, the telemetry service may maintain a continuous time series of operational data that includes a number value of successfully executed operations, and a number value of unsuccessfully executed operations. This information can be utilized by monitors to flag operations that may be related to code regressions and/or other issues such as network and/or hardware problems.

According to examples, when a software update is pushed to the cloud-based application service (e.g., one or more applications hosted by the service are modified), a telemetry analysis and comparison engine associated with the cloud-based application service may compare one or more time series of operational data from a duration of time just prior to the software update, with a time series corresponding to a time after the software update has been implemented into the service. The telemetry analysis and comparison engine may inspect the operation logs for each of the time series and compare them with one another to determine which operations were present in the pre-software update time series and which operations are present in the post-software update time series. In this manner, a determination can be made as to which operations in the post-software update time series have been added, modified and/or deleted compared with the pre-software update time series. For any operations that have been added via a software update, a dynamic monitor engine may generate a new monitor for flagging potential issues associated with those newly added operations. For any operations that have been modified via a software update, the dynamic monitor engine may modify an existing monitor for flagging potential issues associated with those modified operations. For any operations that have been deleted via a software update, the dynamic monitor engine may delete each corresponding monitor that was present in the pre-software update time series.

In dynamically generating new monitors and modifying existing monitors, the dynamic monitor engine may analyze time series operational data associated with the operations that the monitors are being generated and modified for. For example, when a new monitor is being generated for a new operation, the dynamic monitor engine may analyze operational data including operation logs for that new operation for a duration of time. That is, the dynamic monitor may analyze at least one time series for the operation. The dynamic monitor may utilize one or more machine learning models to determine a baseline that can be utilized by the monitor. The baseline may relate to a number of successfully or unsuccessfully executed operations over time, a percentage of successfully executed operations over time, and/or a duration of time that each operation in a set amount of time took to complete (i.e., latency). The dynamic monitor engine may utilize time series data to identify a normalized range for one or more of those metrics. For example, the dynamic monitor engine may determine that a baseline from 0-1000 unexpected failures per every five minutes should be established for a first operation; that a baseline between 50 milliseconds and 150 milliseconds for completing the operation should be established; and/or that a baseline of between 90-100% successfully executed operation requests should be established for the operation. These are simply examples and it should be understood that various machine learning models applied to different datasets may dynamically establish different normalized baselines. Additionally, each baseline that is established may be dynamic or static. That is, for dynamic baselines, the baseline may vary based on a variety of factors, including time of day, day of the week, month, and other contextual data. Alternatively, static baselines may remain constant regardless of the contextual data associated with them.

In some examples, in generating and/or modifying monitors, the dynamic monitor engine may determine a threshold outside of the baseline for flagging an operation for further analysis and/or review. In other examples, the thresholds may be manually set. For example, a threshold may be set for a number of operational failures received per X minutes over a baseline number of operational failures received per X minutes. In another example, a threshold may be set for a percentage of operational successes per X minutes under the lower bounds of the baseline percentage that an operation must fall below for the monitor to flag that operation. In still another example, a threshold may be set for a latency metric such that a certain duration of time over an upper baseline latency must be met for operations for the monitor to flag that operation. In additional examples, an operation may not be flagged unless a time series for that operation exceeds two or more thresholds (e.g., two or more of a latency threshold, an unsuccessful operation threshold, and/or a percentage of successes threshold).

The systems, methods, and devices described herein provide technical advantages for detecting code regressions and issues that impact functionality in cloud-based application services. Memory and processing costs (CPU cycles) associated with accurately detecting code regressions in software builds for large cloud-based application services are reduced by the dynamic and automated nature of the described mechanisms. Additionally, time and human resources that would otherwise be needed to create, modify, and/or delete monitors for such services are reduced significantly. The described mechanisms provide a way for cloud-based services to automatically generate, modify and delete operational monitors on the fly such that when new software updates are rolled out to those services, the operations can be monitored for code regressions immediately and without taking up human developer time and resources. Even with robust developer pools to draw from, without the currently described mechanisms, it is difficult if not impossible to keep monitors current for continuously changing software in large cloud-based application services. The dynamic nature of the described mechanisms also provides a way for each monitor to take the processing resources available to the system into account when determining how many time series should be analyzed for each operation, how long each analyzed time series should be, how many operations should and can be monitored based on the constraints of the system, as well as what baselines and thresholds should be applied for flagging each operation for further review (e.g., if fewer resources are available baselines and/or thresholds may be more generous).

FIG. 1 is a schematic diagram illustrating an example distributed computing environment 100 for dynamically configuring monitors for a cloud-based application service. Distributed computing environment 100 includes service modification sub-environment 101, network and processing sub environment 136, and dynamic monitors sub-environment 130. Network and processing sub-environment 136 comprises network 140, via which any of the computing devices in distributed computing environment 100 may communicate with one another; server computing device 138; and time series data/event logs data storage 142.

A monitoring service that monitors operational data from one or more cloud-based applications may reside on one or more computing devices in network and processing sub-environment 136, and the monitoring service may receive operational data from a telemetry service. In some examples, the monitoring service and the telemetry service may be different services. In other examples, the monitoring service and the telemetry service may be the same service. The telemetry service may receive operational data (e.g., operational success counts, operational failure counts, operation latency data, etc.), which can be utilized by one or more monitors of the monitoring service. For example, one or more cloud-based applications may report operational errors to the telemetry service and monitors of the monitoring service may determine whether drops in quality of services associated with one or more cloud-based applications correspond to code regressions in new or modified operations included in new software builds, server issues and/or network problems. In some examples, operational successes and errors may be automatically reported to a telemetry database by the cloud-based applications when they occur. In other examples, an opt-in system may exist such that, at least in the production environments, users must op-in to allow the operational data to be automatically reported to the telemetry database.

Service modification sub-environment 101 includes application development sub-environment 128 and application sub-environment 102. There are three development teams in application development environment 128 (although there could be more or fewer). Team A 132 is responsible for creating, modifying and/or maintaining software and software updates for application A 104. Team B 134 is responsible for creating, modifying and/or maintaining software and software updates for application B 112. Team C 136 is responsible for creating, modifying and/or maintaining software and software updates for application C 120. In this example, each of the development teams have rolled out a software update for their respective applications, which is illustrated by software update 127, which is pushed to those respective applications via the cloud-based application service operating in network and processing sub-environment 136.

In the illustrated example, the previous build of application A 104 prior to implementation of software update 127 included operation1 106, operation2 108 and operation3 110. Operation3 110 is shown with dashed lines around it to illustrate that it has been removed from application A 104 via software update 127. The previous build of application B 112 prior to implementation of software update 127 included operation4 114 and operation5 116. Operation6 118 has been added to application B 112 via implementation of software update 127. Application C 120 prior to implementation of software update 127 included operation7 122, operation8 124 and operation9 126. Operation9 126 is shown with dotted lines around it to illustrate that it has been modified from a previous version via implementation of software update 127.

A telemetry service operating in network and processing sub-environment may store time series data and event logs for operations associated with the cloud-based application service in time series data/event logs database 136. For example, the telemetry service may receive operational data for a plurality of operations associated with one or more cloud-based applications, and store that information in addition to the time that the information was received and/or that each corresponding operational event occurred. One or more monitors associated with the cloud-based application service may analyze operational time series data from the telemetry service to determine whether code regressions exist in software for one or more of the applications hosted by the cloud-based application service.

In dynamic monitors sub-environment 130, old monitors 132 correspond to each monitor that was monitoring telemetry data for the cloud-based application service prior to implementation of software update 127. That is, monitor M1 106* monitored telemetry data for operation1 106 for application A 104; monitor M2 108* monitored telemetry data for operation2 108 for application A 104; monitor M3 110* monitored telemetry data for operation3 110 for application A 104; monitor M4 114* monitored telemetry data for operation4 114 for application B 112; monitor M5 116* monitored telemetry data for operation5 116 for application B 112; monitor M7 122* monitored telemetry data for operation7 122 for application C 120; operation M8 122* monitored telemetry data for operation8 124 for application C; and operation M9 126* monitored telemetry data for operation9 126 for application C.

A telemetry analysis and comparison engine associated with the telemetry service and/or monitor service may analyze time series data and event logs from operational events that took place in a time series prior to implementation of software update 127 and compare that data with time series data and event logs from operational events that took place after implementation of software update 127. The time series data and/or event logs may include a name of each operation that was executed in relation to the cloud-based application service, an indication of whether each operational event was successful or unsuccessful, a duration of time that each operation took to complete and/or time out, a designation of whether a monitor exists for monitoring each operation, and/or a designation of a specific monitor that is monitoring each operation if such a monitor exists. In comparing the time series data and event logs from the pre-software update time series and the post-software update time series, the telemetry analysis and comparison engine may make a determination as to which operations have been deleted, added and/or modified by implementation of software update 127. Additionally, the telemetry analysis and comparison engine may make a determination based on the time series comparison as to which operations in the post-software update time series have existing monitors, which operations in the post-software update time series need to be updated based on operations being modified via implementation of software update 127, which operations in the post-software update need new monitors to be created for them because they have been added via implementation of software update 127, and/or whether and which monitors need to be deleted because operations have been deleted via implementation of software update 127.

Once a determination has been made as to which operations have been modified, deleted and/or added via software update 127, a dynamic monitor engine may modify one or more existing monitors, delete one or more existing monitors and/or generate one or more new monitors. That is, for each operation that was deleted via software update 127 for which a monitor existed, the dynamic monitor engine may delete that monitor; for each new operation that was added via software update 127, dynamic monitor engine may generate a new monitor; and for each operation that was modified via software update 127 for which a monitor existed, the dynamic monitor engine may modify the corresponding monitor.

In modifying and/or generating new monitors, the dynamic monitor engine may apply one or more machine learning models (e.g., Holt Winters, principal component analysis, etc.) to telemetry datasets to determine one or more baselines for operation success or failure levels and/or counts, and/or baselines for operation execution latency. For example, one or more machine learning models may be applied to one or more post-software update time series of operational data and determine a baseline that success, error and/or latency datapoints from that time series fall into. In some examples, the baseline may be dynamic in that it changes based on one or more factors (e.g., time of day, date, month, context, etc.). In other examples, the baseline may be static in that it does not change regardless of the factors that are associated with it. For example, a dynamic baseline may be generated for an operation failure count and/or percentage of operational failures where a number of operational failures and/or percentage of operational failures increase during various times of day and/or night. Alternatively, a static baseline may be generated for an operation failure count and/or percentage of operational failures where a number and/or percentage of operational failures remain relatively static over the course of a day.

Once a baseline has been determined for an operation, a threshold value outside of that baseline may be identified for flagging time series data that exceeds that threshold. For example, a monitor for an operation may identify a threshold number of operational failures outside of a baseline failure number that a time series must exceed over a threshold duration of time (i.e., "time window") for the monitor to flag the time series as potentially relating to a code regression or otherwise being potentially problematic. In another example, a monitor for an operation may identify a threshold percentage of operational failures outside of a baseline failure percentage that a time series must exceed over a threshold duration of time for the monitor to flag the time series as potentially relating to a code regression or otherwise being potentially problematic. In another example, a monitor for an operation may identify a threshold duration of time outside of a baseline latency duration that operations for a time series must exceed for the monitor to flag the time series as potentially relating to a code regression or otherwise being potentially problematic. The threshold values may be automatically determined based on one or more machine learning models and/or the threshold values may be manually selected. Like the baselines, the threshold values may be dynamic or static. In some examples, the thresholds may be set to zero (i.e., any readings over or under a baseline may result in operation flagging).

Figure 3:
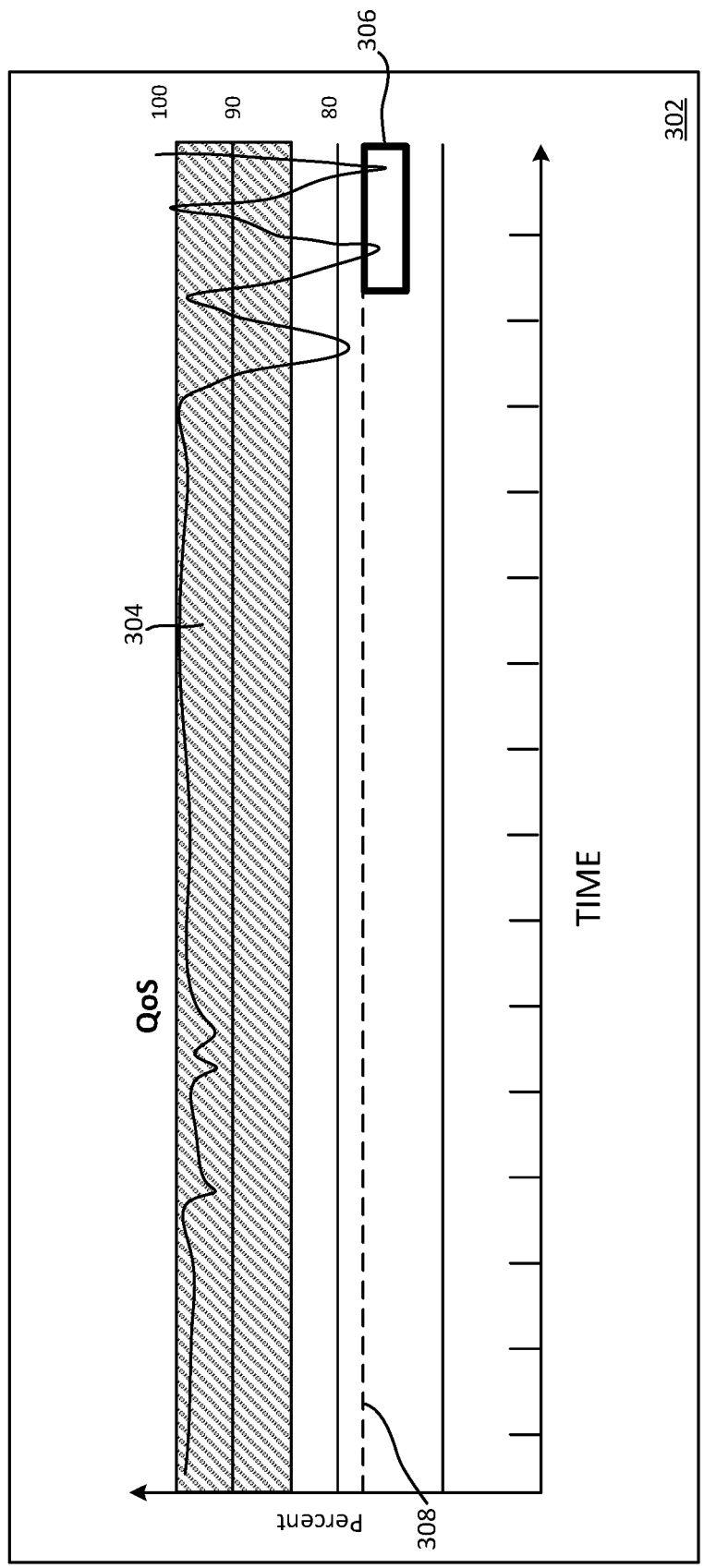
FIG. 3 illustrates a graphical display of operation data for a cloud-based application service with a dynamically configured monitor applied to a quality of service metric.
Figure 4:
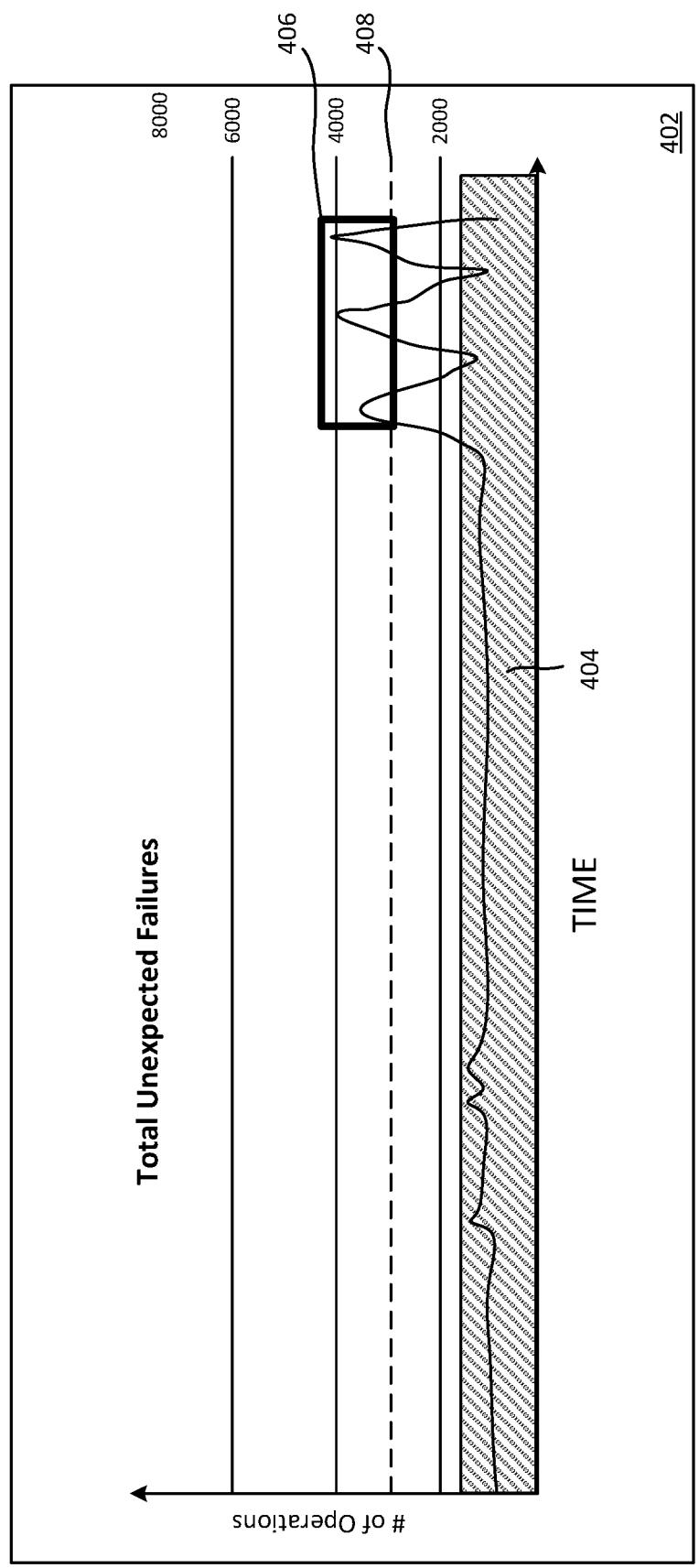
FIG. 4 illustrates a graphical display of operation data for a cloud-based application service with a dynamically configured monitor applied to a total unexpected failure metric.

Additional information regarding the baseline and threshold generation and application of the same is provided herein in relation to FIG. 3 and FIG. 4.

In dynamic monitors sub-environment 130, new monitors 134 correspond to the monitors that exist for operations post-incorporation of software update 127. Specifically, while monitors M1 106*, M2 108*, M4 114*, M5 116*, M7 122* and M8 124* remain post-software update 127 because their corresponding operations have not been modified or deleted, monitor M3 110* has been deleted (as indicated by the dashed line surrounding it) because its corresponding operation (operation3 110) has been deleted via software update 127, monitor M9 126* has been modified (as indicated by the dotted line surrounding it) because its corresponding operation (operation9 126) has been dynamically modified via software update 127, and monitor M6 118* has been dynamically generated by the dynamic monitor engine because its corresponding operation (operation6 118) has been added to application B 112 via software update 127.

Figure 2:
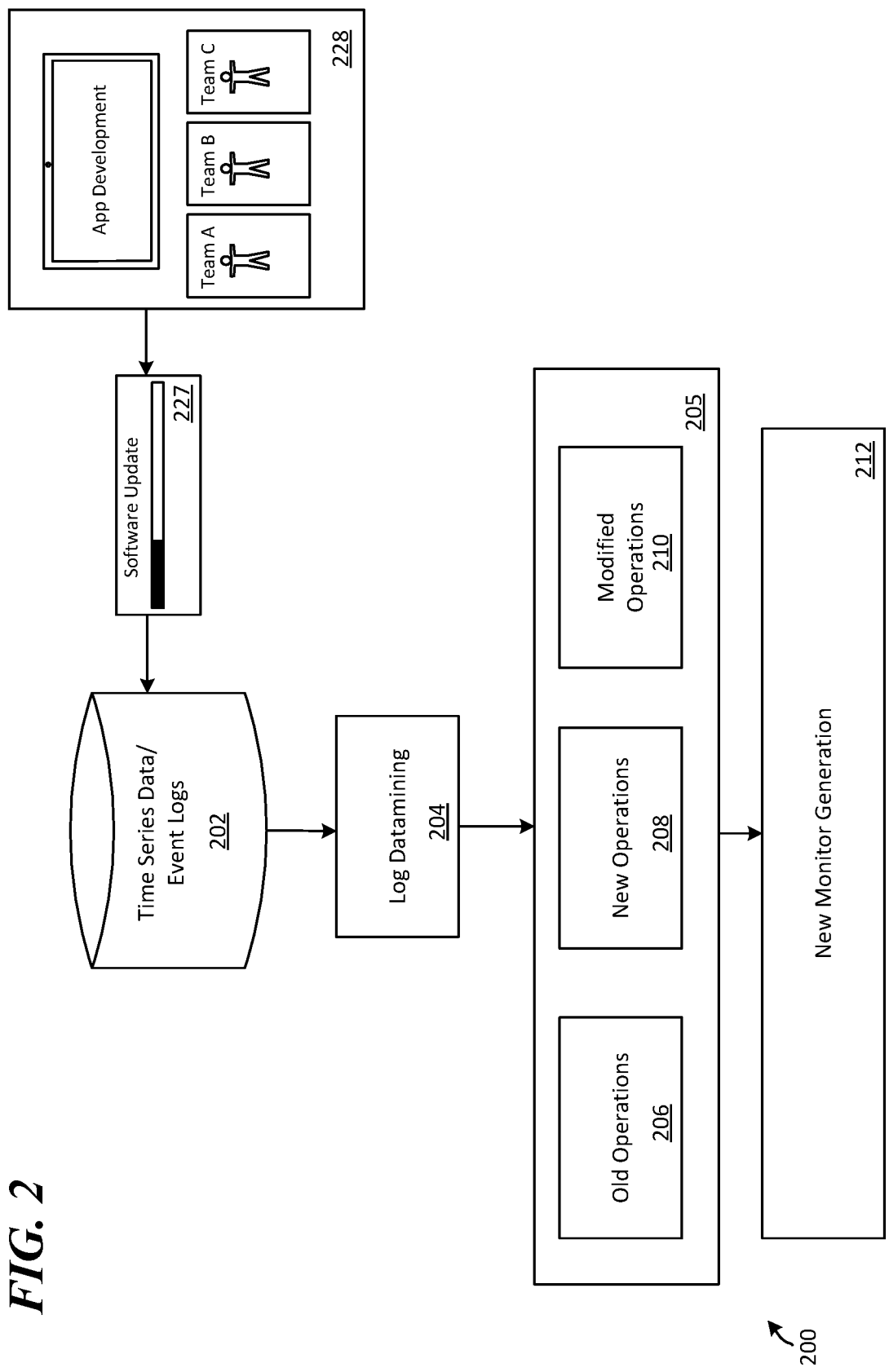
FIG. 2 illustrates a basic flow diagram for dynamically configuring monitors for a cloud-based applications service.

FIG. 2 illustrates a basic flow diagram 200 for dynamically configuring monitors for a cloud-based application service. Flow diagram 200 includes application development sub-environment 228 and software update 227. Application sub-environment 228 includes three development teams (team A, team B and team C), which are all software development teams that create and update software for the cloud-based application service. In this example, the teams have rolled out a new software update (software update 227) which is being applied to the cloud-based application service. The software update has been applied to one or more cloud-based applications, and time series data for the applications prior to and after the software update has been stored in time series data/event logs database 202.

Log datamining element 204 comprises the analysis and comparison of operation logs from one or more pre-software update time series and one or more post-software update time series. A comparison engine may identify which operations and corresponding monitors existed in the cloud-based application service and/or telemetry service pre-software update and compare those operations and monitors to operations and monitors that exist in the cloud-based application service and/or telemetry service post-software update.

The result of the log datamining is illustrated by comparison results element 205. Comparison results element 205 includes old operations 206 (i.e., operations that existed pre-software update and/or that still exist from the previous software build post-software update), new operations 208 (i.e., operations that have been added via software update 227), and modified operations 210 (i.e., operations that existed pre-software update and that have been modified via incorporation of software update 227).

New monitor generation element 212 illustrates the generation of new monitors that are dynamically created via application of machine learning models to time series data for operations that are new to the cloud-based application service based on implementation of software update 227. New monitor generation element 212 also illustrates the deletion of existing monitors that are no longer useful due to deletion of operations from the cloud-based application service based on their removal via software update 227. Additionally, new monitor generation element 212 illustrates the modification of exiting monitors that are modified to accurately flag code regressions based on the corresponding operations that have been modified via software update 227.

FIG. 3 illustrates a graphical display 302 of operation data for a cloud-based application service with a dynamically configured monitor applied to a quality of service metric. The data corresponding to graphical display 302 may be associated with a telemetry service that receives and stores operational event data and operation event logs for the cloud-based application service. The telemetry service may keep logs of each operation that has been initiated by a user of a cloud-based application hosted on the service. The logs may include an identity of each operation that was initiated, whether each initiated operation was successfully or unsuccessfully executed, a duration of time that each operation took to complete or time out, an identity of a server or server farm that executed each request associated with each operation, an indication of whether a monitor is associated with each initiated operation, and/or an identity of each monitor that is associated with each initiated operation.

The telemetry service may take the raw operational event data that it collects/receives and generate one or more graphs of the data, such as the graph shown on graphical display 302. The graph in FIG. 3 is a quality of service graph (for the cloud-based application service) that illustrates a percentage of initiated operations of a specific operation type that have been executed successfully (on the Y-axis) over a duration of time (on the X-axis). In this example, the dynamic monitor engine has automatically generated a new monitor for the specific operation that is represented in the graph. In doing so, the dynamic monitor engine has determined and set a baseline percentage 304 corresponding to a successful operation range for the specific operation that the operation typically falls within. This range, which is illustrated by the diagonal lined rectangle of the baseline percentage 304 from 85 percent to 100 percent, is shown as being static for the duration of time included in the graph. However, it should be understood that the baseline may be dynamic or static. For example, the illustrated baseline may relate to a day-time normalized range for the specific operation, and the baseline may change for an evening-time normalized range for the specific operation.

In this example, a threshold 308 has been identified and set either by a machine learning mechanism or a manual interaction with the telemetry service. Threshold 308 corresponds to a percentage outside of the baseline that the quality of service has to drop to for the telemetry service to flag the specific operation as potentially being an issue (e.g., the specific operation potentially relating to a code regression). In this example, the threshold 308 has been set to 77.5 percent (i.e., 7.5 percent below the lower bounds of baseline percentage 304). Thus, in this example, the monitor for the specific operation would flag the portion 306 of the graph that has fallen below threshold 308. Although the specific operation has been flagged due to identification of the portion 306 of the graph falling below threshold 308, that time series data and/or time series data surrounding that time series data may be provided for analysis of the flagged issue.

FIG. 4 illustrates a graphical display 402 of operation data for a cloud-based application service with a dynamically configured monitor applied to a total unexpected failure metric. The data corresponding to graphical display 402 may be associated with a telemetry service that receives and stores operational event data and operation event logs for the cloud-based application service. The telemetry service may keep logs of each operation that has been initiated by a user of a cloud-based application hosted on the service. The logs may include an identity of each operation that was initiated, whether each initiated operation was successfully or unsuccessfully executed, a duration of time that each operation took to complete or time out, an identity of a server or server farm that executed each request associated with each operation, an indication of whether a monitor is associated with each initiated operation, and/or an identity of each monitor that is associated with each initiated operation.

The telemetry service may take the raw operational event data that it collects/receives and generate one or more graphs of the data, such as the graph shown on graphical display 402. The graph in FIG. 4 is an unexpected failure graph (for the cloud-based application service) that illustrates a number of initiated operations of a specific operation type that have resulted in an unexpected failure (on the Y-axis) over a duration of time (on the X-axis). In this example, the dynamic monitor engine has automatically generated a new monitor for the specific operation that is represented in the graph. In doing so, the dynamic monitor engine has determined and set a baseline number range 404 of unexpected failures for the specific operation. This spread of numbers corresponds to a range of unexpected failures for the specific operation that the specific operation typically falls within. This range, which is illustrated by the diagonal lined rectangle on graphical display 402, has been set to 0 unexpected failures for the specific operation to 1750 unexpected failures for the specific operation. This range may have been identified based on application of one or more machine learning models to time series data for the specific operation. In this example, the range is a static range; however, it should be understood that the baseline may be dynamic or static. For example, the illustrated baseline may relate to a day-time normalized range for the specific operation, and the baseline may change for an evening-time normalized range for the specific operation (e.g., more or less users may utilize the specific operation during certain hours compared with certain other hours).

In this example, a threshold 408 has been identified and set either by application of a machine learning model to one or more time series for the specific operation or a manual interaction with the telemetry service. Threshold 408 corresponds to a minimum number of total unexpected failures above the baseline that needs to be reached in a time window of a time series for the telemetry service to flag the specific operation as potentially being an issue (e.g., the specific operation potentially relating to a code regression). In this example, the threshold 408 has been set to 3000 unexpected failures (i.e., 1250 unexpected errors more than the upper bounds of the baseline). Thus, in this example, the monitor for the specific operation would flag the portion 406 of the graph that is above threshold 408. Although the specific operation has been flagged due to identification of the portion 406 of the graph that is above threshold 408, that time series data and/or time series data surrounding that time series data may be provided for analysis of the flagged issue.

Figure 5:
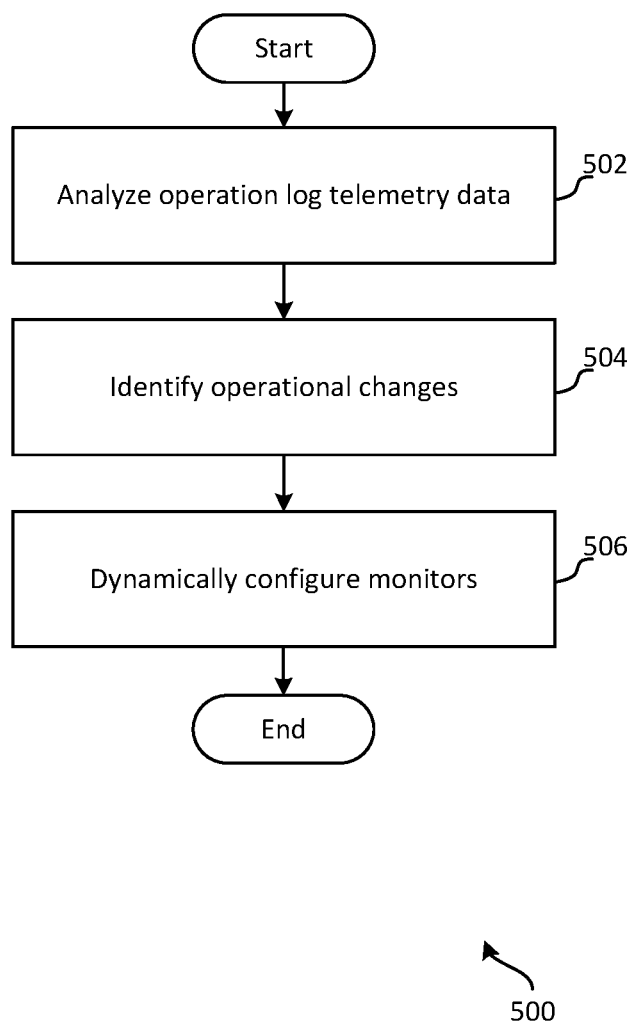
FIG. 5 is an exemplary method for dynamically configuring monitors for a cloud-based application service.

FIG. 5 is an exemplary method 500 for dynamically configuring monitors for a cloud-based application service. The method 500 begins at a start operation and flow moves to operation 502.

At operation 502 telemetry data for a plurality of operations for the cloud-based application service is analyzed. The analysis may comprise comparing a first time series with a second time series, where the data from the second time series relates to operations that were executed prior in time compared with execution of operations related to the first time series. Each analyzed time series may comprise operational event data from operations associated with the cloud-based application service. That operational event data may include an identity/name of each operation that was initiated, executed, and/or completed; a time of occurrence that each operation was initiated, executed, and/or completed; an indication of whether a monitor exists for each operation that was initiated, executed, and/or completed; an identity of each monitor that exists for each operation that was initiated, executed, and/or completed; a duration of time that each operation took to complete and/or time out; and/or an identity of a server or server farm that attempted execution of each operation. In some examples, the comparison of the two time series may be automatically initiated based on an indication that a software update has been provided to the cloud-based application service. The second time series may correspond to a duration of time prior to incorporation of the software update in the cloud-based application service, and the first time series may correspond to a duration of time after incorporation of the software update in the cloud-based application service.

From operation 502 flow continues to operation 504 where one or more operational changes in the cloud-based application service are identified. The identification is based on the time series comparison performed at operation 502. The identification is made by determining whether operations have been added, deleted and/or modified based on the software update to the cloud-based application service. For example, when a software update is incorporated into the cloud-based application service, one or more operations that were included in one or more applications hosted by the cloud-based application service prior to the software update may be modified, added, or deleted based on the incorporation of that software update.

From operation 504 flow continues to operation 506 where at least one telemetry monitor is dynamically configured based on the one or more operational changes that were identified at operation 502. The dynamic configuration may be performed by a dynamic monitor engine and application of one or more machine learning models to time series data as discussed herein. The dynamic configuration may comprise selecting an appropriate monitoring technique to detect failure patterns for each new operation associated with the one or more operational changes. The dynamically configuring may additionally or alternatively comprise automatically defining a baseline failure rate for each new operation associated with the one or more operation changes and/or defining a threshold failure rate from the baseline failure rate for each new operation associated with the one or more operational changes. In some examples, dynamically configuring the at least one telemetry monitor may include automatically defining a time series window. The time series window may comprise operations executed in a duration of time that each telemetry monitor for each new operation associated with the one or more operational changes will monitor. The dynamic monitor engine may configure monitors to have static and/or dynamic baselines and/or thresholds.

In some examples, a number of the one or more new telemetry monitors for generation may be automatically determined based on available bandwidth for monitoring operations in the cloud-based application service. In additional examples, a number of time series and/or duration of each time series that is monitored may be automatically determined based on available bandwidth for monitoring operations in the cloud-based application service. For example, the processing resources available to the telemetry service may dictate that only a set number of time series may be analyzed over a set duration of time. Therefore, when the monitors are dynamically created, the number of time series they process over that timeframe may be automatically calculated and built into each corresponding monitor.

From operation 506 flow moves to an end operation and the method 500 ends.

Figure 6:
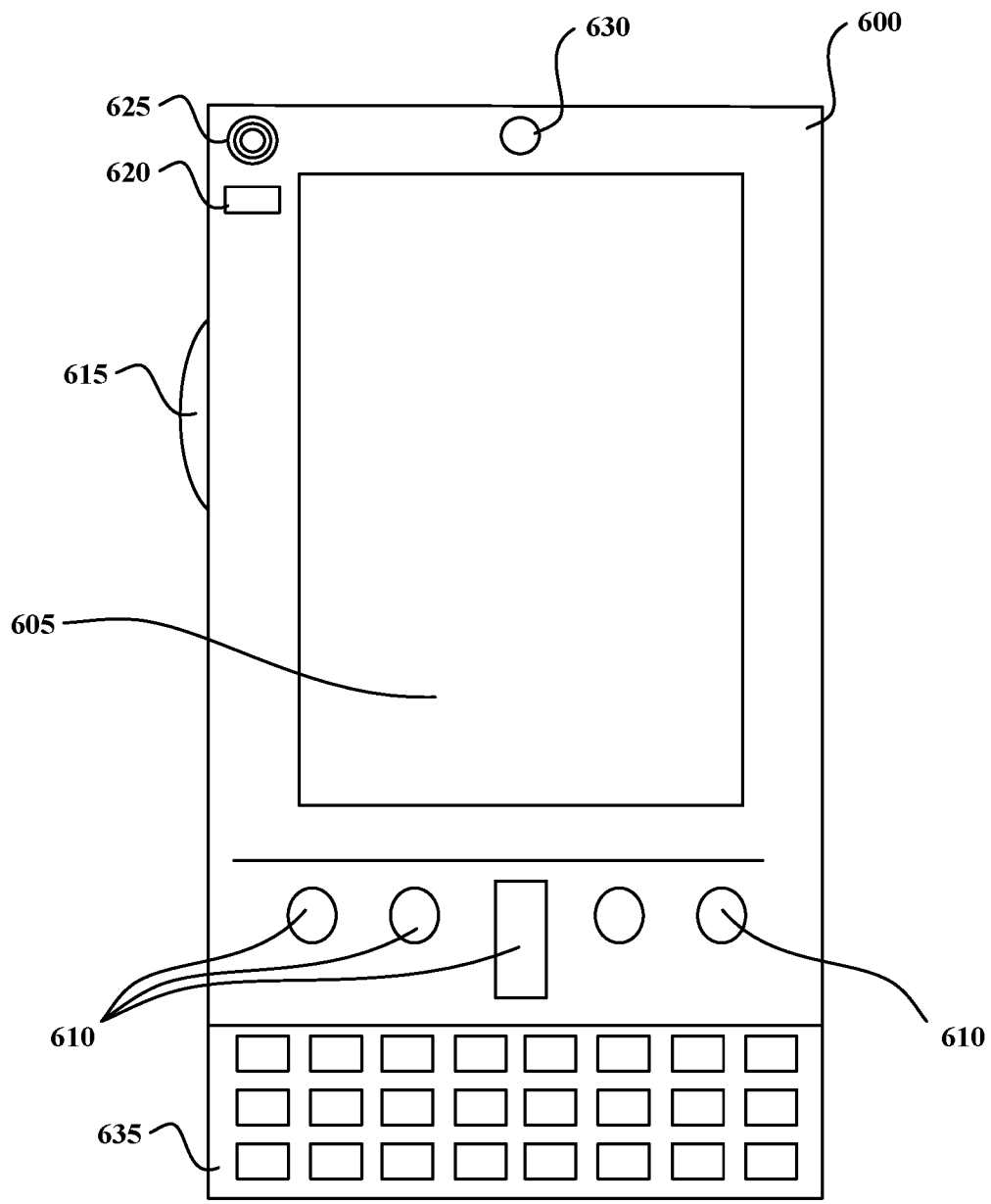
FIGS. 6 and 7 are simplified diagrams of a mobile computing device with which aspects of the disclosure may be practiced.
Figure 7:
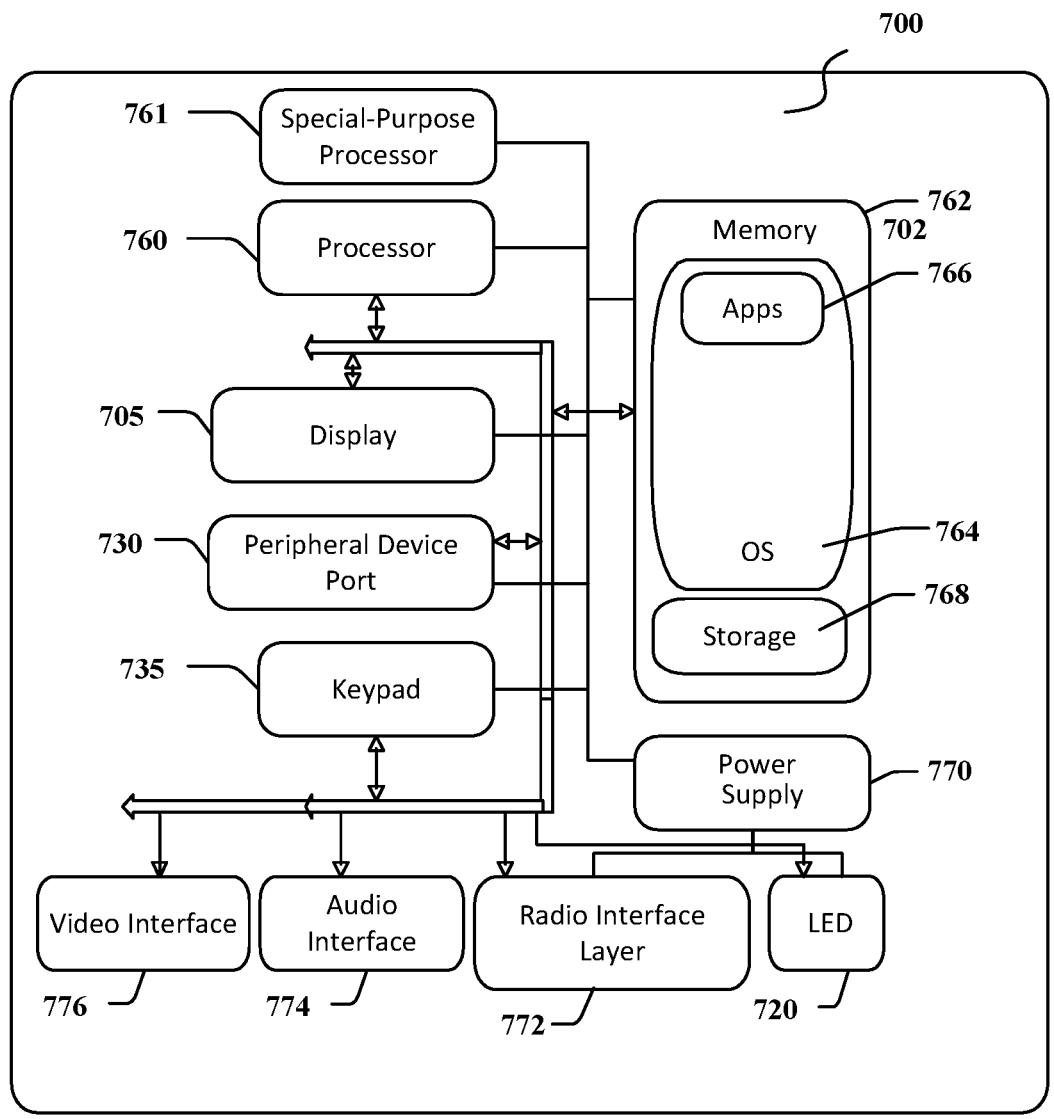

FIGS. 6 and 7 illustrate a mobile computing device 600, for example, a mobile telephone, a smart phone, wearable computer, a tablet computer, an e-reader, a laptop computer, AR compatible computing device, or a VR computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
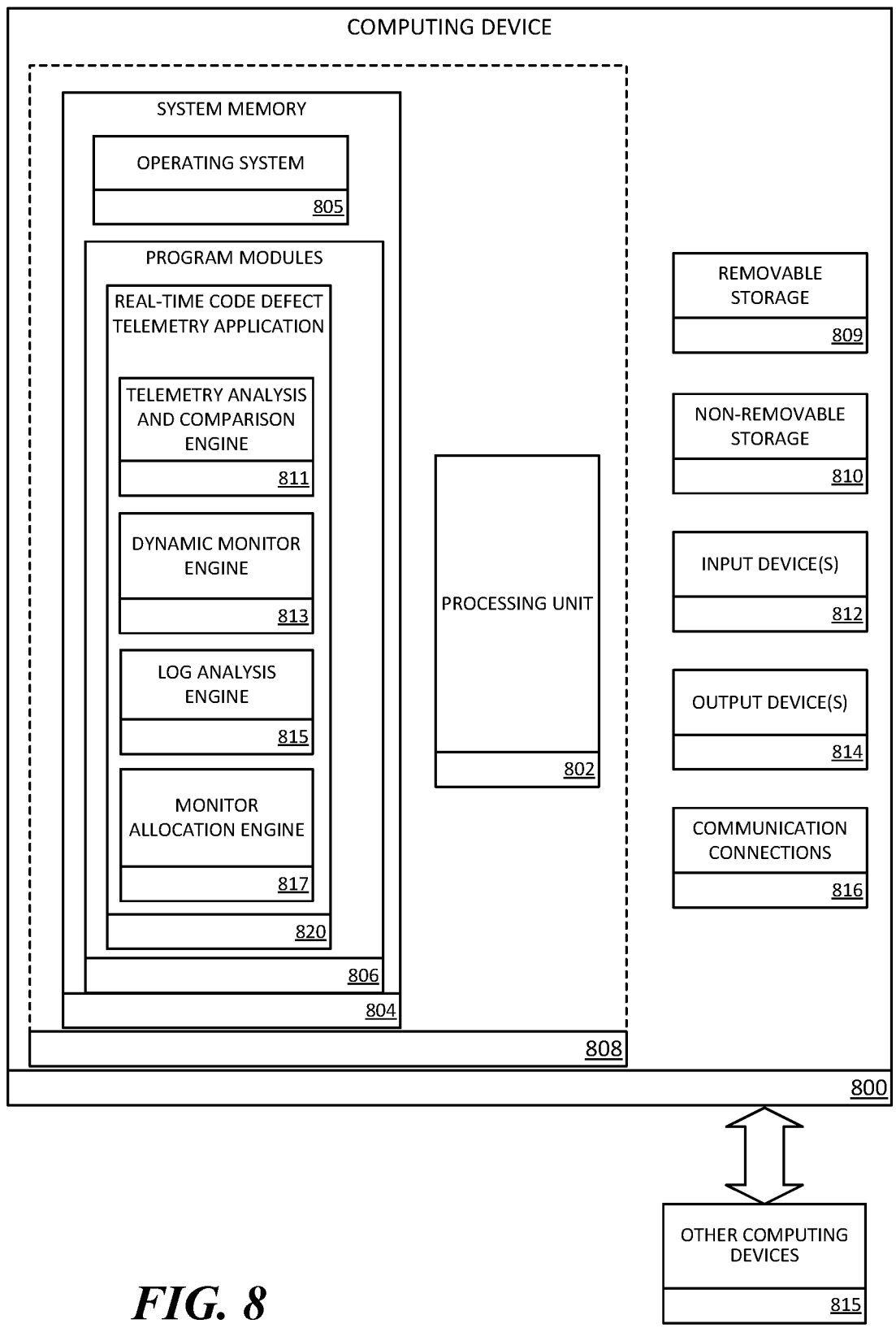
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for dynamically configuring operation monitors for a cloud-based application service. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more operation monitoring programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., real-time code defect telemetry application application 820) may perform processes including, but not limited to, the aspects, as described herein. According to examples, telemetry analysis and comparison engine 811 may identify one or more pre-software update time series and compare those time series to one or more post-software update time series to determine whether new operational monitors should be generated, existing operational monitors should be modified, and/or existing operational monitors should be deleted. Dynamic monitor engine 813 may perform one or more operations associated with generating new monitors and modifying existing monitors for operations in a cloud-based application service. Log analysis engine 815 may perform one or more operations associated with analyzing operational logs from one or more time series and applying that information in machine learning models to create and/or modify monitors, and/or to determine what operational changes have been made via implementation of software updates to a cloud-based application service. Monitor allocation engine 817 may perform one or more operations associated with determining the system resources available to a cloud-based application service and/or a telemetry service, and setting operational monitoring criteria for each monitor in the system (e.g., how many time series are monitored for each operation, how long the time series are, etc.).

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
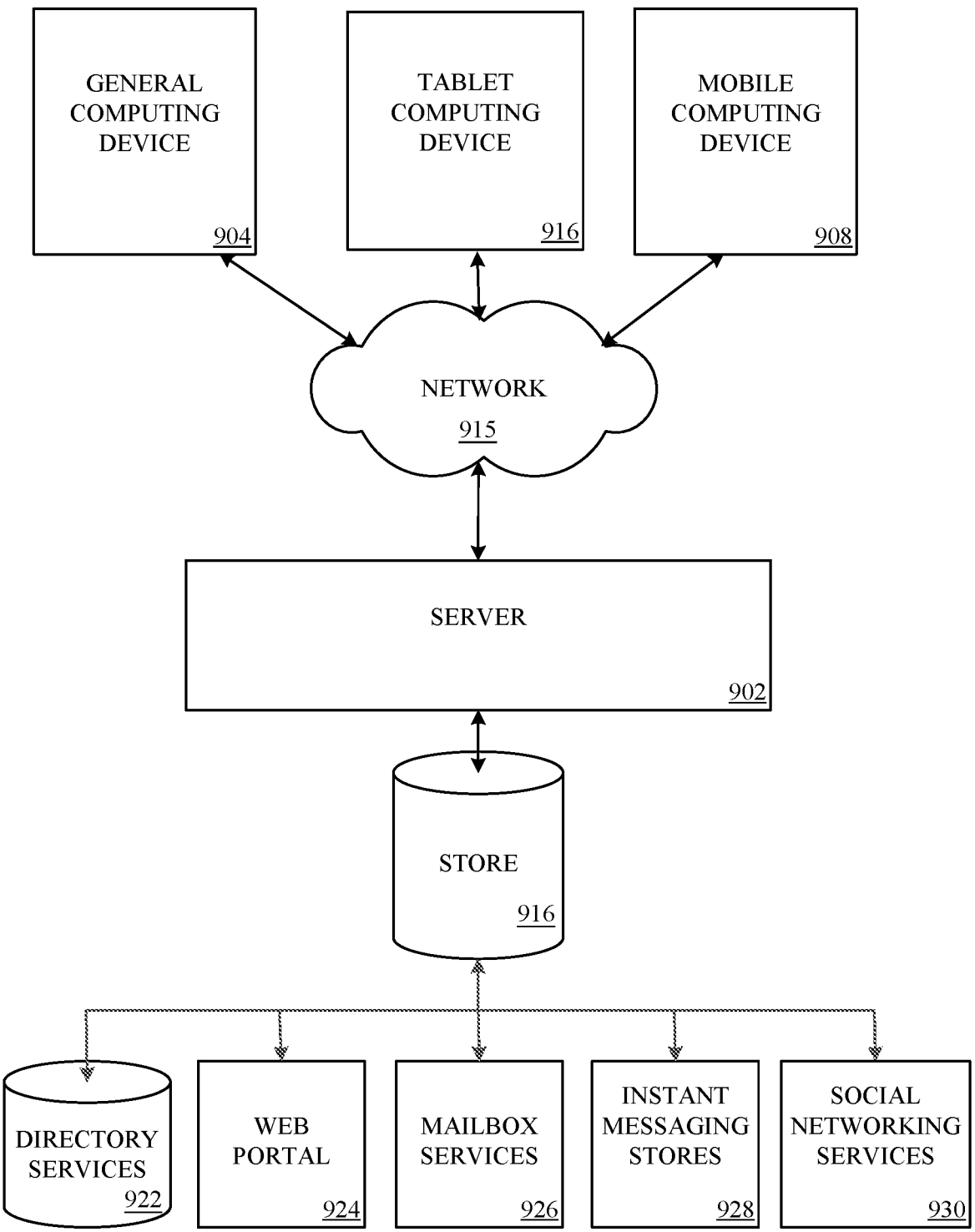
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for monitoring telemetry data from a cloud-based application service, the method comprising:
 analyzing telemetry data for a plurality of operations performed by an application executed on the cloud-based application service, wherein the analysis comprises comparing:
  a first time series comprising data from execution of the application prior to an application update, and
  a second time series comprising data from execution of the application after the application update;
 identifying, based on the analysis, a first operational change in the cloud-based application service, the first operational change comprising an addition of a new operation to the application;

dynamically configuring a telemetry monitor based on the first operational change, wherein the configuring comprises:
    establishing, via application of a first machine learning model to the second time series, a baseline comprising a normalized range of errors during a threshold duration of time for the new operation, and
    establishing, via application of a second machine learning model to the second time series, a threshold value of errors outside of the baseline for the duration of time;
analyzing a third time series comprising data from execution of the application after the application update;
determining that a value of errors exceeds the threshold value of errors for the duration of time in the third time series; and
flagging a portion of the third time series corresponding to the duration of time where the value of errors was determined to exceed the threshold value of errors.

2. The method of claim 1, wherein dynamically configuring the at telemetry monitor comprises selecting an appropriate monitoring technique to detect failure patterns for the first operational change.

3. The method of claim 1, wherein the established baseline is a static baseline.

4. The method of claim 1, wherein the established baseline is a dynamic baseline.

5. The method of claim 1, wherein there are a plurality of new operational changes that are identified based on the analysis, and there are a plurality of new telemetry monitors generated for monitoring data associated with new operations, the number determined based on available bandwidth for monitoring operations in the cloud-based application service.

6. The method of claim 1, further comprising:
identifying a second operational change in the cloud-based application service, wherein the second operational change comprises an operation that has been removed from an application hosted by the cloud-based application service.

7. The method of claim 6, further comprising:
dynamically configuring a second telemetry monitor based on the second operational change, wherein the configuring comprises removing a telemetry monitor that was monitoring data associated with the removed operation.

8. The method of claim 1, further comprising:
identifying a second operational change in the cloud-based application service, wherein the second operational change comprises an operation that has been modified from an application hosted by the cloud-based application service.

9. The method of claim 8, further comprising:
dynamically configuring a second telemetry monitor based on the second operational change, wherein the configuring comprises modifying a telemetry monitor that was monitoring data associated with the modified operation.

10. The method of claim 1, wherein the threshold value of errors comprises one of: a threshold number of errors, and a threshold percentage of errors.

11. A system for monitoring telemetry data from a cloud-based application service, comprising:
a memory for storing executable program code; and
one or more processors, functionally coupled to the memory, the one or more processors being responsive to computer-executable instructions contained in the program code and operative to:
    analyze telemetry data for a plurality of operations performed by an application executed on the cloud-based application service, wherein the analysis comprises comparing:
        a first time series comprising data from execution of the application prior to an application update, and
        a second time series comprising data from execution of the application after the application update;
    identify, based on the analysis, a first operational change in the cloud-based application service, the first operational change comprising an addition of a new operation to the application;
    dynamically configure a telemetry monitor based on the first operational change, wherein the configuring comprises:
        establishing, via application of a first machine learning model to the second time series, a baseline comprising a normalized range of errors during a threshold duration of time for the new operation, and
        establishing, via application of a second machine learning model to the second time series, a threshold value of errors outside of the baseline for the duration of time;
    analyze a third time series comprising data from execution of the application after the application update;
    determine that a value of errors exceeds the threshold value of errors for the duration of time in the third time series; and
    flag a portion of the third time series corresponding to the duration of time where the value of errors was determined to exceed the threshold value of errors.

12. The system of claim 11, wherein in dynamically configuring the telemetry monitor the one or more processors are further responsive to the computer-executable instructions contained in the program code and operative to:
select an appropriate monitoring technique to detect failure patterns for the first operational change.

13. The system of claim 11, wherein the established baseline is a static baseline.

14. The system of claim 11, wherein the established baseline is a dynamic baseline.

15. The system of claim 11, wherein the one or more processors are further responsive to the computer-executable instructions contained in the program code and operative to:
identify a second operation change in the cloud-based application service, wherein the second operational change comprises an operation that has been removed from an application hosted by the cloud-based application service.

16. The system of claim 15, wherein the one or more processors are further responsive to the computer-executable instructions contained in the program code and operative to:
dynamically configure a second telemetry monitor based on the second operational change, wherein the configuring comprises removing a telemetry monitor that was monitoring data associated with the removed operation.

17. The system of claim 11, wherein the one or more processors are further responsive to the computer-executable instructions contained in the program code and operative to:
identify a second operational change in the cloud-based application service, wherein the second operational change comprises an operation that has been modified from an application hosted by the cloud-based application service.

18. The system of claim 17, wherein the one or more processors are further responsive to the computer-executable instructions contained in the program code and operative to:
  dynamically configure a second telemetry monitor based on the second operational change, wherein the configuring comprises modifying a telemetry monitor that was monitoring data associated with the modified operation.

19. A computer-readable storage device comprising executable instructions that, when executed by one or more processors, assists with monitoring telemetry data from a cloud-based application service, the computer-readable storage device including instructions executable by the one or more processors for:
  analyzing telemetry data for a plurality of operations performed by an application executed on the cloud-based application service, wherein the analysis comprises comparing:
    a first time series comprising data from execution of the application prior to an application update, and
    a second time series comprising data from execution of the application after the application update;
  identifying, based on the analysis, a first operational change in the cloud-based application service, the first operational change comprising an addition of a new operation to the application;
  dynamically configuring at least one a telemetry monitor based on the first operational change, wherein the configuring comprises:
    establishing, via application of a first machine learning model to the second time series, a baseline comprising a normalized range of errors during a threshold duration of time for the new operation, and
    establishing, via application of a second machine learning model to the second time series, a threshold value of errors outside of the baseline for the duration of time;
  analyzing a third time series comprising data from execution of the application after the application update;
  determining that a value of errors exceeds the threshold value of errors for the duration of time in the third time series; and
  flagging a portion of the third time series corresponding to the duration of time where the value of errors was determined to exceed the threshold value of errors.

20. The computer-readable storage device of claim 19, wherein the established baseline is a static baseline.

* * * * *